United States Patent
Serrurier

(10) Patent No.: US 10,023,156 B2
(45) Date of Patent: Jul. 17, 2018

(54) WASHING TUNNEL FOR MOTORCYCLES

(71) Applicant: SERRURIER PROJETS BREVETS, Paris (FR)

(72) Inventor: Yann Serrurier, Paris (FR)

(73) Assignee: SERRURIER PROJETS BREVETS, Paris (FR)

( * ) Notice: Subject to any disclaimer, the term of this patent is extended or adjusted under 35 U.S.C. 154(b) by 65 days.

(21) Appl. No.: 14/834,072

(22) Filed: Aug. 24, 2015

(65) Prior Publication Data
US 2016/0059830 A1  Mar. 3, 2016

(30) Foreign Application Priority Data

Aug. 29, 2014 (FR) ...................................... 14 58101

(51) Int. Cl.
*B60S 3/00* (2006.01)
*B60S 3/04* (2006.01)

(52) U.S. Cl.
CPC ............. *B60S 3/004* (2013.01); *B60S 3/008* (2013.01); *B60S 3/041* (2013.01)

(58) Field of Classification Search
CPC .......... B60S 3/004; B60S 3/008; B60S 3/041

USPC ........................................................ 134/123
See application file for complete search history.

(56) References Cited

U.S. PATENT DOCUMENTS

2002/0112745 A1* 8/2002 Belanger ................... B60S 3/06
134/34
2003/0146256 A1* 8/2003 Olsen, Jr. .................. B60R 5/00
224/311

FOREIGN PATENT DOCUMENTS

EP          0637531 B1 * 11/1996  ............. B60S 3/041

* cited by examiner

*Primary Examiner* — Michael E Barr
*Assistant Examiner* — Tinsae B Ayalew
(74) *Attorney, Agent, or Firm* — Miller, Matthias & Hull LLP

(57) ABSTRACT

Washing facility for two- or three- wheeled vehicle where the vehicle is conveyed longitudinally by mechanical means opposite washing devices, where the facility comprises a lower longitudinal guiding device in order to guide a wheel of the vehicle on the floor along the longitudinal displacement thereof and an upper guiding device made firmly connected to the handlebars of the vehicle in order to keep the vehicle in vertical position.

8 Claims, 5 Drawing Sheets

WASHING TUNNEL FOR MOTORCYCLES

CROSS-REFERENCE TO RELATED APPLICATION

This application claims priority under the Paris Convention to French Patent Application No. 14 58101 filed on Aug. 29, 2014.

FIELD OF THE DISCLOSURE

The present invention relates to facilities for washing two- or three-wheeled vehicles.

More specifically, the invention relates to a washing facility for two- or three-wheeled vehicles in which said vehicle is placed and held in equilibrium with respect to the washing device.

BACKGROUND OF THE DISCLOSURE

The document WO2009108165 describes an example of such a washing facility. The vehicle is placed in a washing enclosure and a cleaning system is mobile around the vehicle in order to clean it. The vehicle is held in fixed position by the kickstand assembly thereof and by a guiding system contained in the floor of the cleaning enclosure, with the wheels turning on small conveyor belts. Such a washing facility is complex because it requires many mobile parts which can be moved relative to the vehicle Such a facility also needs to be provided with conveyor belts to turn the wheels during cleaning to provide good cleaning thereof. Additionally, such a washing facility cannot wash more than one vehicle at a time.

The purpose of the present invention is especially to remedy these drawbacks. It relates to a washing facility for two- or three-wheeled vehicles in which said vehicle is conveyed opposite washing devices by mechanical means.

SUMMARY OF THE DISCLOSURE

For that purpose, the invention is a facility of the type in question wherein is comprised a lower longitudinal guiding device extending on the floor of the facility in order to guide at least one wheel of the vehicle along the longitudinal displacement thereof and an upper guiding device made firmly connected to the handlebars of the vehicle in order to keep the vehicle in substantially vertical position.

Because of these dispositions, the washing device is simplified; the rotation of the wheels of the vehicle, naturally induced by the movement of the vehicle, provides better cleaning of the wheels and the rims. Since the vehicle is also kept in equilibrium by the upper guiding device, the wheels will also be better extended for cleaning thereof and the kickstand remains in the retracted position thereof. Furthermore, the device for holding the vehicle by upper and lower guiding provides a better equilibrium of the conveyed vehicle. Additionally, such a facility opens the possibility of cleaning more than one vehicle at a time.

In preferred embodiments of the invention, one or another of the following dispositions could additionally be used:
- The lower longitudinal guiding device can comprise at least one groove, where said groove is suited to receive at least one wheel of the vehicle, which represents a simple solution for guiding a wheel of the motorcycle on the floor;
- The upper guiding device advantageously comprises a rail circuit and at least one guiding bracket, where said guiding bracket is suited to slide along the rail circuit and where said guiding bracket is suited to be connected to the handles of the handlebar of the vehicle; the motorcycle can thus be kept in vertical equilibrium while it is conveyed through washing;
- The guiding bracket includes a guiding cart suited to slide along the rail circuit and a central arm connected to the guiding cart, where the central arm is connected to two lateral arms extending laterally from the central arm and comprising grips at the ends thereof suited to engage with the handles of the vehicle; thus the handles are used as a nearly standard interface in order to keep the motorcycle in vertical equilibrium while it is conveyed;
- The central arm can be telescopic, each of the lateral arms can comprise a yoke the length of the central arm being adjustable in order to adjust the height where the yokes and the handles line-up; in this way the height is easily adjusted in order to properly line-up on the handles;
- The two lateral arms can be adapted to telescopically extend transversely relative to the central arm in order to adjust the separation thereof to the width of the vehicle between the two handles thereof; in this way the separation of the arms can be easily adjusted according to the separation of the handles of the vehicle;
- The ends of the lateral arms can be provided with grips, where said grips are suited to grip the handles of the handlebars of the vehicle; which provides an improved hold;
- The lateral arms can comprise protective elements suited to protect fragile elements of the vehicle when said vehicle is conveyed opposite the washing devices; this way vehicle damage and untimely breakage is avoided;
- The facility can comprise a system of chains suited to drive the guiding bracket along the rail circuit, where the guiding bracket comprises drive fingers suited to engage respectively on one of the chains; thus both the conveying during the washing operations and also optionally the return of the brackets to the starting point can be mechanized;
- Advantageously the facility is suited to convey several vehicles (for example several motorcycles) one after the other along the washing facility.

Other features and advantages of the invention will become apparent during the following description of one of the embodiments thereof, given as a nonlimiting example, with reference to the attached drawings.

DETAILED DESCRIPTION OF THE DISCLOSURE

Figure 1:
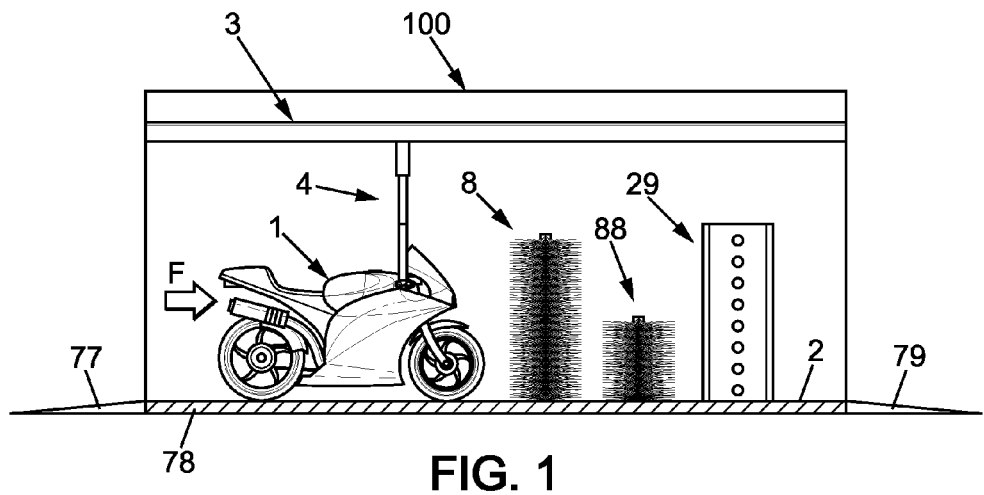
FIG. 1 is a schematic profile view of a motorcycle washing facility according to the invention.

As shown in FIG. 1, a vehicle 1, motorcycle type, is conveyed by mechanical means along a direction referred to as longitudinal, L, in a washing facility 100. In the present document, the term 'conveyed' or 'conveyance' designates a progressive and regular movement caused by one of mechanical means, preferably at substantially constant speed (referenced in the figures by the arrow F).

The vehicle loaded at the entrance of the facility 100 is progressively placed opposite several successive washing devices and then released at the exit of the facility 100. The vehicle 1 is both guided longitudinally by a lower guiding device 2 and kept in vertical position by an upper guiding device 3. The transversal or transverse direction T is the horizontal direction perpendicular to the longitudinal direction L of displacement of the vehicle 1.

Such a vehicle 1 can for example be a conventional motorcycle (as shown on the figures), or even a three-wheeled cycle, or else a bicycle or other (not shown).

In everything that follows, the ground itself will be distinguished from the floor of the facility 100.

In everything that follows, a two-wheeled vehicle 1 will have both wheels thereof disposed one after the other along the longitudinal direction of the vehicle 1, which is the longitudinal direction of displacement of the vehicle; a three-wheeled vehicle 1 will have one front or rear wheel aligned with the longitudinal axis of the vehicle and the two other wheels thereof, respectively rear or front, on either side of the longitudinal direction of the vehicle 1.

The washing facility 100 illustrated in FIG. 1 includes for example as floor of the facility a raised floor 78 and also includes a suspended ceiling. In the case where the raised floor of the facility 100 is higher than the level of the ground, the facility 100 can for example include an access ramp part 77 for reaching the level of the raised floor from the level of the ground. The facility 100 can also include an exit ramp 79 for returning to the level of the ground from the level of the raised floor. A water recovery system 78 can be arranged for example between the raised floor and the ground in order to recover used water. The water recovery can for example have a height between 10 and 40 cm. As a variant, the facility 100 can be built at ground level with prior masonry work serving to dig a trench in the ground for water recovery, for example. As a variant not shown, the facility 100 might not include a suspended ceiling. The washing facility 100 can comprise a washing device with main brush rollers 8, auxiliary rollers 88, with vertical axis Z, a drying device 29 and any other auxiliary accessory which works on the vehicle 1.

Figure 2:
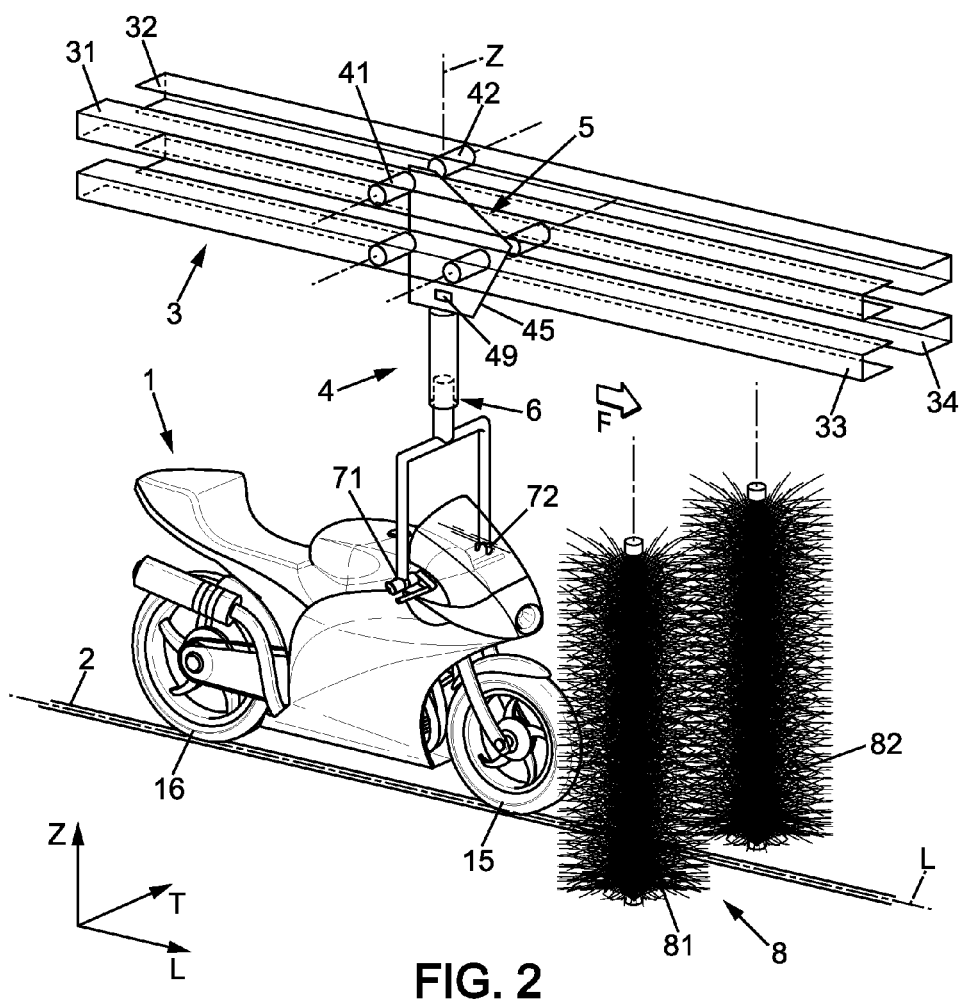
FIG. 2 is a schematic perspective view of the washing facility from FIG. 1.

In particular as illustrated in FIG. 2, the vehicle is guided in the longitudinal displacement thereof by lower longitudinal guiding device 2 extending along the floor of the facility 100 and guiding at least one wheel. The vehicle is also held at the same time in vertical position (upright position) by an upper guiding device 3 made firmly connected to the handlebars 10 of the vehicle.

The lower longitudinal guiding device 2 is, for example, a V-shaped groove which extends along the floor of the facility 100, as shown in FIG. 2. In a variant, the groove could be U-shaped. In the case of a facility 100 placed directly on the ground, the prior masonry work will make it possible, for example, to form a lower guiding device such as a groove directly in the floor. The lower longitudinal guiding device 2 is suited to longitudinally guide the vehicle 1 and limit or even prevent displacement thereof along the transverse direction T. It is in particular suited to receive at least one wheel of the vehicle 1. In the case of a vehicle with two wheels 15 and 16, it can receive both wheels, one after the other.

In the case of a vehicle with three wheels, one disposed along the longitudinal axis of the vehicle 1 and the two others disposed on either side of the longitudinal axis of the vehicle 1, the lower longitudinal guiding device 2 can receive the wheel disposed along the longitudinal axis of the vehicle 1.

As a variant, the lower longitudinal guiding device 2 can comprise three mutually parallel grooves suited to receive respectively the three wheels the vehicle 1 in case of a vehicle 1 with three wheels. More specifically, the lower longitudinal guiding device 2 can comprise a central groove and optionally two grooves on either side of the central groove. In the case of a three-wheeled vehicle 1, the wheel disposed along the longitudinal axis of the vehicle 1 can be placed in the central groove and the two wheels disposed on either side of the axis of the vehicle can be received by the two lateral grooves on either side of the central groove.

The upper longitudinal guiding device 3 shown in FIG. 2 is suited to keep the vehicle 1 in vertical position, meaning for avoiding displacement of the conveyed vehicle 1 outside of the general plane defined by the longitudinal direction L of movement of the vehicle and by the vertical direction Z. The upper longitudinal guiding device 3 is configured to firmly connect with the handlebars 10 of the vehicle to keep the vehicle substantially in vertical position.

The upper longitudinal guiding device 3 can for example have the shape of a guiding bracket 4. The guiding bracket 4 is movable along a circuit disposed at a vertical distance from the lower longitudinal guiding device 2, above the vehicle 1. For example, it's a matter of a circuit of rails. In the case of a washing tunnel comprising a suspended ceiling, the circuit of rails can be attached to the ceiling. The guiding bracket 4 includes for example a guiding cart 5 moving along said rails. There can for example be four rails 31, 32, 33, 34, where the upper rails 31 and 32 are parallel and located vertically above the lower parallel rails 33 and 34.

The guiding cart 5 includes rolling elements 41 for movement of the guiding cart 5 along the rails. For example, the guiding cart 5 can include two rolling elements 41 sliding in the upper rails 31 and 32 and four rolling elements 41 sliding in the lower rails 33 and 34, where the four supports on the lower rail serve to avoid instability of the vehicle 1 in the longitudinal direction L during traction in the vehicle by the movement of the cart 5.

The rolling elements 41 are, for example in the example illustrated, rollers rolling along the rails. The guiding bracket 4 also comprises a central telescopic arm 6 rigidly linked to the guiding cart 5 and extending along the vertical direction Z. The central telescopic arm 6 is suited to be adjusted in length in order to be able to adjust the height thereof when taking-in the vehicle 1, but is transversely rigid (along T).

Figure 3:
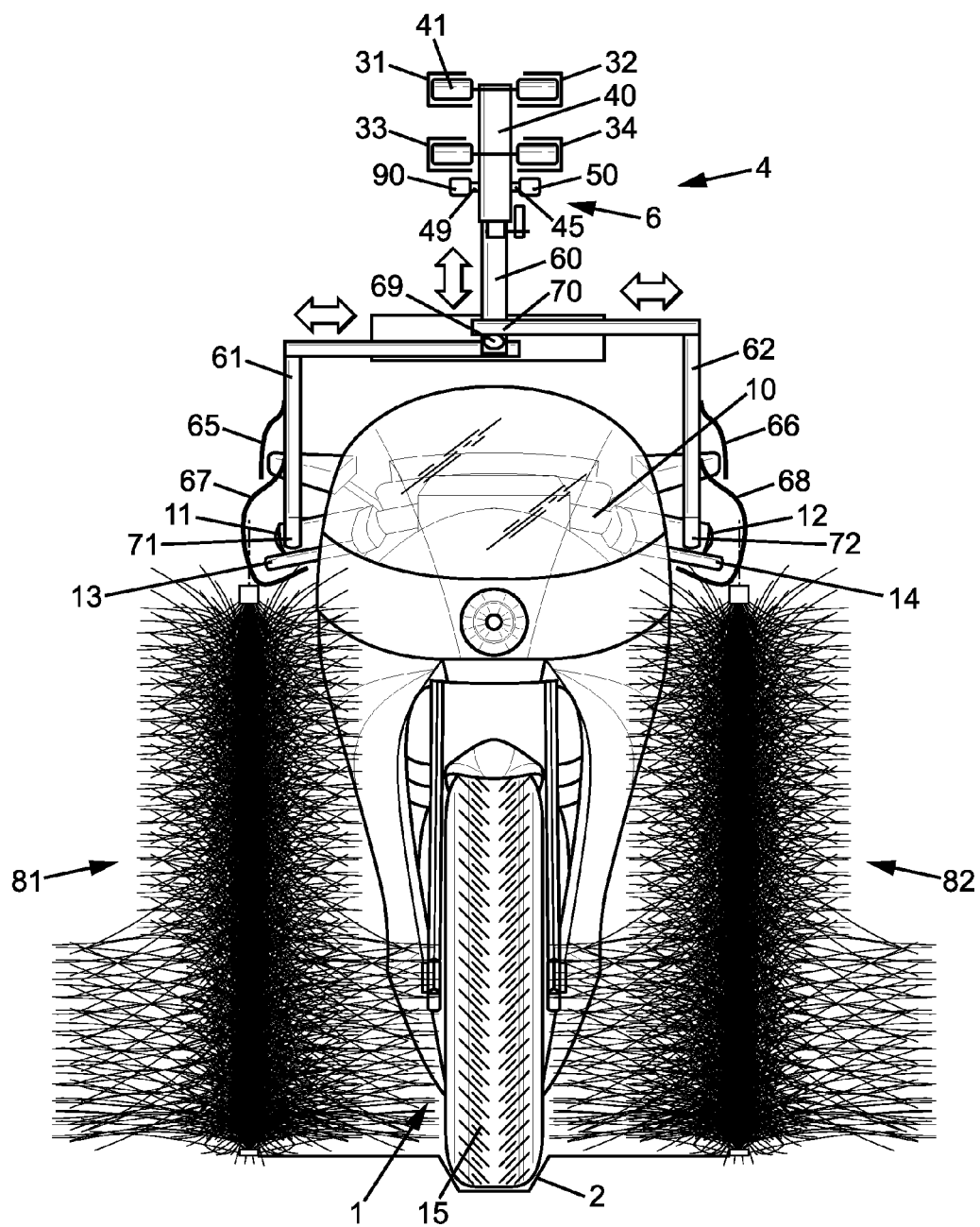
FIG. 3 is a front view of the washing facility from FIG. 1, FIGS. 4*a*, 4*b* and 4*c* are side views of the washing facility from FIG. 1, showing steps of the progression of the motorcycle.

As shown in FIG. 3, the central telescopic arm 6 can in particular comprise two sections, such as two tubular portions 40 and 60 with one entering the other and mobile relative to each other, where the lower tubular portion 60 has for example a smaller diameter than the upper tubular portion 40.

The sections of the tubular portions are preferably not surfaces of revolution and can preferably be elliptical or rectangular in order to void rotation of the one inside the other, which guarantees the proper alignment of the bracket in the transverse direction.

The central telescopic arm 6 can be adjusted in length, which serves to easily adjust the height of the interface with the handles of the handlebar of the vehicle. The central telescopic arm 6 can next be locked by a locking device 50, especially in the position where said arm keeps the vehicle in equilibrium.

The locking device 50 can make use of a deformable female part suited to tighten and deform on the male part (such as a crimping collar) under stress exerted by a two position, high and low, locking system. The lower tubular portion 60 can advantageously be naturally returned upward by a spring housed inside the lower tubular section 40.

Note that in the case where the tubular portions are cylinders of revolution, the locking device 50 also serves to provide rotational immobilization in order to avoid relative rotation of the two cylinders 40 and 60 and to avoid axial offsetting of the two lateral arms 61 and 62 relative to the transverse direction T.

Additionally, two lateral arms, 61 and 62, attached or hinged on the lower tubular portion 60 of the central telescopic arm 6, are provided.

Figure 6:
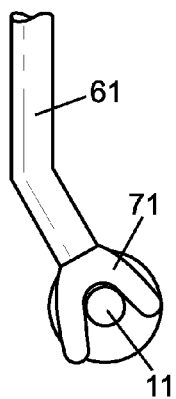
FIG. 6 shows a detailed view of the interface between the guiding bracket and the handlebar handle.

The two lateral arms 61, 62 respectively comprise yokes 71 and 72 at the lower ends thereof suited to engage respectively with the handles 11 and 12 the vehicle 1 (FIG. 6). The lateral arms 61 and 62 can be bent in order to avoid interference related to the presence of a windscreen on the vehicle 1.

As shown in FIG. 6, the yokes 71 and 72 can for example be simple sideways V-shaped elements, suited for engaging with the handles 11 and 12 of the vehicle 1 so as to hold it in equilibrium. As a variant the ends of the arms 61 and 62 can comprise grips or clips suited for gripping the handles 11 and 12, including in the lower part of the handles.

The lateral arms 61 and 62 can likewise comprise cylindrical housings for receiving the handles from the outer side.

The invention also provides the possibility of adjusting the relative separation of the lateral arms by a mechanism which guarantees the left-right equilibrium/balance. In the case in the example shown, each lateral arm can be provided with a rack 70 engaged with a central pinion 69 arranged in the central lower part of the lower tubular portion 60.

The two lateral arms 61, 62 can thus be extended symmetrically and telescopically on either side of the central telescopic arm 6 in order to adjust the separation thereof to the width of the vehicle 1 between the two handles 11 and 12 thereof when taking it in. This is serves to assure a good centering of the motorcycle during installation thereof.

In a variant, the upper guiding device could also have the shape of a simple telescopic pole with sufficient transverse rigidity.

As shown in FIG. 3, the guiding bracket 4 can also comprise elements for protection of the fragile parts of the vehicle 1. These protective elements can be formed by bent tubes 65, 66 which come to protect the projection of the side view mirrors, or bent tubes 67 suited to protect the brake lever 13 and/or even a tube 68 suited to protect the clutch lever 14.

The vehicle 1 is conveyed along the washing facility 100 opposite several washing elements 8. As illustrated in FIG. 4, the vehicle is especially conveyed between washing rollers, such as a system of four rollers arranged for example in a square 81, 82, 88, 89, seen from above. The brush rollers 81, 82, 89, 89 are for example vertical-axis rotating rollers with strands which, under the effect of the centrifugal force of rotation, sweep the outside of the vehicle 1 during passage thereof between the brush rollers 81, 82, 88, 89.

Figure 4A:
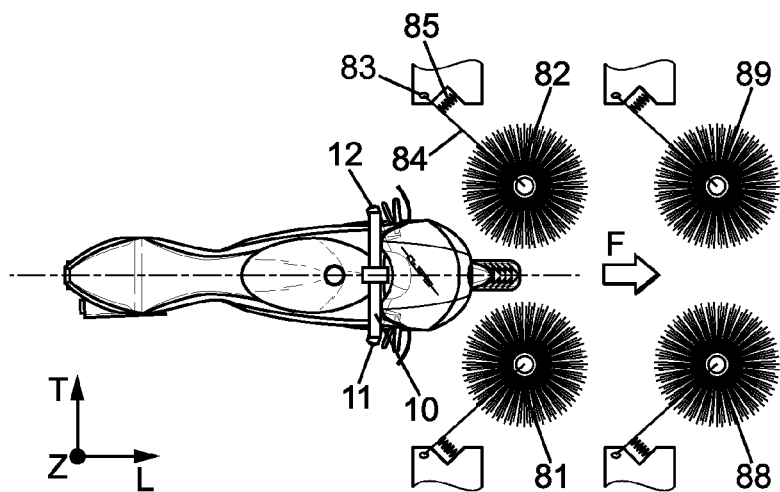

As shown in FIG. 4A, the rollers 81, 82, 88, 89 are each mounted on a mobile arm 84 in particular so that the position thereof can change in real time and adapt to various types of vehicles and so that it can separate upon passage of each vehicle.

In the example shown, the arm is mounted pivotatably around a fixed axis 83 and is returned in the direction of the axis by a restoring spring 85. Thus each roller has a resting position where the ends of the rotating strands come to act in the neighborhood of the longitudinal axis.

Figure 4B:
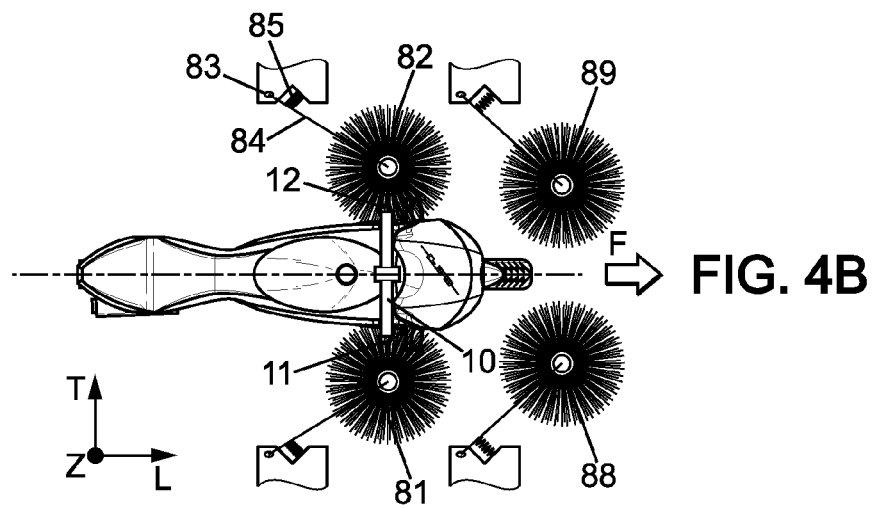
Figure 4C:
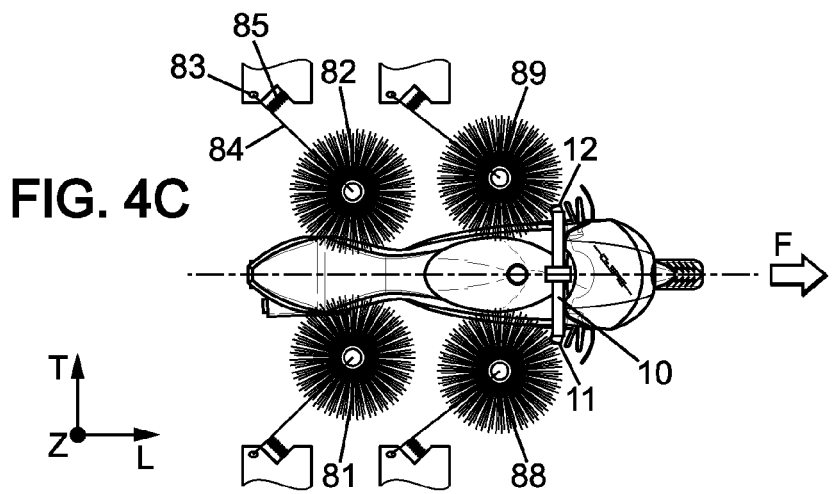

During passage of the vehicle 1, by sweeping the vehicle 1, the rollers 81, 82, 88, 89 are separated from the resting position as shown in FIGS. 4b and 4c during the progression of the vehicle 1. The protectors 65, 66, 67, 68 serve to avoid damage by the rollers 81, 82, 88, 89 to the fragile parts of the vehicle 1 and to avoid actuating the brake lever.

Figure 5:
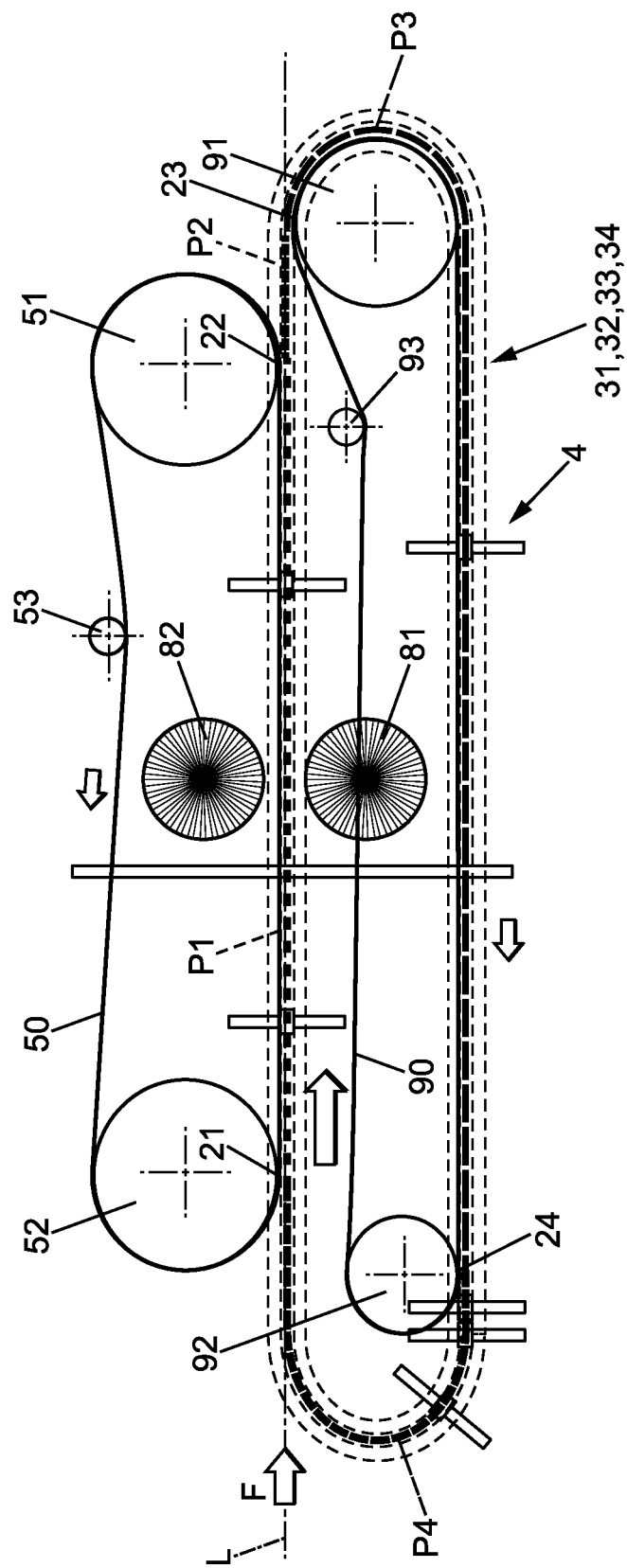
FIG. 5 is a top view of the guiding and driving parts of the washing facility.

The invention provides for mechanical means to convey the vehicle 1 held by the guiding bracket 4 along the washing facility 100. As illustrated in FIG. 5, a guiding bracket 4, progressing along the rail circuit, is driven along the circuit by driving from the guiding cart thereof 5. The guiding bracket 5 drives the vehicle to be washed along a portion of the rail. The circuit followed by a guiding cart 5 includes five portions P1, P2, P3, P4 from the point of taking the vehicle 1 in by the guiding bracket until the return of this same guiding bracket to the point of taking-in a new vehicle 1.

A first portion P1 corresponds to the effective mechanized driving of the cart during washing operations of the vehicle 1, a second portion P2 corresponds to a first free course done by the guiding cart 5, a third portion P3 of driving corresponds to the optional motorized return of the guiding cart 5 and a fourth portion P4 corresponds to a second free course of the guiding cart 5.

On FIG. 5, it can be noted that the course P1 goes from location 21 to location 22, the course P2 goes from location 22 to location 23, course P3 goes from location 23 to location 24, and the course P4 goes from location 24 to location 21.

In order to be driven along the rail, the guiding cart 5 uses two systems of chains in the T, L plane and parallel to the rail circuit in the central part. A first chain 50 does the driving of the bracket (brackets) for the washing operations; a second optional chain 90 does the operations to return the brackets to the loading zone. In the example shown, the guiding cart 5 comprises parts suited for meshing with the chains.

More precisely, the upper tubular portion 40 of the bracket comprises, transversely on both sides, drive fingers 49 and 45 suited for meshing with a chain. The first chain 50 is driven by two wheels 51, 52, for example with equivalent diameters, of which only one can be powered. Additionally, a pushrod-mounted idler-roller 53 is provided in order to put the chain 50 under the desired tension and thus to take up slack and wear.

Analogously, the second chain 90 is driven by two wheels 91, 92, for example with equivalent diameters, of which only one can be powered. Additionally, a pushrod-mounted idler-roller 93 is provided in order to put the chain 90 under the desired tension and thus to take up slack and wear.

The meshing of the drive fingers 49 and 45 on the chain can be passive, as shown in the figures, meaning that the chain and the cart mutually approaching naturally causes the meshing of the chain with the drive finger.

As a variant, the drive fingers can be mobile between a position retracted into the bracket 4 and an extended position, as a function for example of a manipulation done by the user, for example near the bracket 4, or by using meshing levers. In this case, an engagement results from intentional action, especially on the courses P1 and P3.

When the guiding cart 5 arrives at the entrance of the first section P1, the part of the guiding cart 5 engages via the drive finger 45 thereof with the chain 50. The guiding cart 5 is then driven along the first rail section P1 by the drive from the chain 50. In the section P1, the guiding cart 5 drives the loaded vehicle 1 along the washing circuit, meaning successively opposite cleaning devices 8. The speed of the chain 50 is suited to the speed required in order to allow the washing of the vehicle by the facing washing devices; it can for example be 1 to 2 m/min.

At location 22, meaning at the end of washing, the drive finger 45 is released from the chain 50 (by 'natural' separation arising from the course of the chain), and then the guiding cart 5 can be manually pulled along the section P2 of the rail (meaning pushed by an operator).

At location 23, the interface of the guiding cart 5 engages with chain 90 from the other side via drive finger 49. The guide cart 5 is then driven by the chain 90 on the section 93, by driving from the chain 90. This involves the return section for the guiding cart 5. The displacement speed of the guiding cart 5 in this section is therefore uncorrelated with the speed thereof in section P1 and can for example be faster.

At the junction between the courses P3 and P4, at location 24, the drive finger 49 is released from the chain 90, and then the guiding cart 5 can be manually pulled along section P4 of the rail up to the junction point between courses P4 and P1 for loading a new vehicle 1 on the guiding bracket 4.

In the case of several guiding carts 5 moving on the rail circuit, in the case for example of sequential washing, the guiding carts 5 can be stored in the section P4 if several are available at the same time. The section P4 near the junction with P1 also corresponds the section in which the vehicle 1 is taken up by a guiding cart 5. The distance between the guiding carts 5 during the use thereof is for example adaptable especially based on how busy the use is.

It should be noted that the circuit for rails 31, 32, 33, 34 includes two straight portions, one 'forward' and one other 'return' and two semicircular portions which serve to continuously connect the two straight portions according to a closed circuit with stadium track shape.

As an alternative to the use of chains, it is possible to use notched belts provided with teeth and flexible metal cables for traction.

Note that the facility 100 can be an automatic facility, meaning that all the washing devices are automatic, for example.

Note that the return of the brackets could be done manually, meaning without requiring the second chain 90 such as previously described.

It should be noted that it is also alternately considered that the brackets fill the guiding and maintaining in equilibrium functions without necessarily filling the traction function, since the traction function can be provided by different distinct means, for example a mobile pusher independent of the bracket which would push the vehicle longitudinally during washing operations.

Note also that the washing equipment 8 especially the rollers and the drying bank can be supplemented by any other device for treatment and/or protection and/or maintenance of the motorcycle.

In an embodiment of the invention, the washing facility 100 could be integrated with an existing washing facility, for example a facility for washing four-wheeled vehicles, and with an existing car washing tunnel, for example.

The invention claimed is:

1. A washing facility configured to wash vehicles comprising at least motorcycles, each of the vehicles comprising a handlebar with handles, in which each of the vehicles is conveyed longitudinally during washing by a mechanical conveyor opposite washing devices, where the facility comprises:
   a lower longitudinal guiding device extending along the floor of the facility in order to guide at least one wheel of the vehicle along the longitudinal displacement thereof;
   an upper guiding device made to form a firm connection between the mechanical conveyor and the handlebar of the vehicle under washing in order to move the vehicle under washing and to keep the vehicle in a substantially vertical position, wherein the firm connection between the mechanical conveyor and the handlebar maintains a centered alignment of the at least one wheel of the vehicle within the lower longitudinal guiding device, wherein the upper guiding device comprises a rail circuit and at least one guiding bracket, where said guiding bracket is suited to slide along the rail circuit, and said guiding bracket is suited to be connected to the handles of the handlebar of the vehicle, via two yokes open at least toward the down direction, and wherein the two yokes engage with the handles of the handlebar to hold the vehicle in equilibrium and maintain the centered alignment of the vehicle within the lower longitudinal guiding device.

2. The facility according to claim 1, such that the lower longitudinal guiding device comprises at least one groove, where said groove is suited to receive at least one wheel of the vehicle.

3. The facility according to claim 1, wherein the guiding bracket includes a guiding cart suited to slide along the rail circuit and a central arm connected to the guiding cart, where the central arm is connected to two lateral arms extending laterally from the central arm.

4. The facility according to claim 3, wherein each of the lateral arms comprises one of the two yokes, wherein the central arm is telescopic, where the length of the central arm is adjustable in order to adjust the height where the yokes and the handles line-up.

5. The facility according to claim 3, wherein the two lateral arms are adapted to telescopically extend transversely relative to the central arm in order to adjust their separation to the width of the vehicle between the two handles thereof.

6. The facility according to claim 3, wherein the lateral arms comprise protective elements suited to protect fragile elements of the vehicle when said vehicle is conveyed opposite the washing devices.

7. The facility according to claim 1, comprising a system of two chains suited to drive the guiding bracket along the rail circuit, where the guiding bracket comprises drive fingers suited to engage respectively on one of the chains.

8. The facility according to claim 1, suited to convey several vehicles one after the other along the washing facility.

\* \* \* \* \*